(12) United States Patent
Hollowell et al.

(10) Patent No.: US 8,005,193 B2
(45) Date of Patent: Aug. 23, 2011

(54) SYSTEM AND METHOD FOR SIMPLE UNIFIED MESSAGING

(75) Inventors: Brian K. Hollowell, Austin, TX (US); David W. Rackley, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 326 days.

(21) Appl. No.: 10/714,585

(22) Filed: Nov. 14, 2003

(65) Prior Publication Data

US 2005/0105697 A1   May 19, 2005

(51) Int. Cl.
*H04M 11/00*   (2006.01)
(52) U.S. Cl. .................. 379/88.13; 379/88.17
(58) Field of Classification Search ............. 379/88.13, 379/88.14, 88.17, 88.25, 88.12, 88.18, 88.21, 379/88.22; 709/206
See application file for complete search history.

(56) References Cited

U.S. PATENT DOCUMENTS

| | | | | |
|---|---|---|---|---|
| 5,778,053 A * | 7/1998 | Skarbo et al. | ............... | 379/93.21 |
| 5,826,026 A * | 10/1998 | Friedman | ............... | 709/217 |
| 6,020,916 A * | 2/2000 | Gerszberg et al. | ......... | 348/14.07 |
| 6,026,152 A * | 2/2000 | Cannon et al. | ........... | 379/142.06 |
| 6,282,565 B1 * | 8/2001 | Shaw et al. | ............... | 709/206 |
| 6,304,636 B1 * | 10/2001 | Goldberg et al. | ........... | 379/88.14 |
| 6,341,160 B2 * | 1/2002 | Tverskoy et al. | ........... | 379/88.13 |
| 6,483,899 B2 * | 11/2002 | Agraharam et al. | ........... | 379/88.14 |
| 6,621,800 B1 * | 9/2003 | Klein | ............... | 370/282 |
| 6,765,996 B2 * | 7/2004 | Baxter, Jr. | ............... | 379/88.14 |
| 6,853,714 B2 * | 2/2005 | Liljestrand et al. | ........... | 379/201.03 |
| 7,162,013 B2 * | 1/2007 | Gavette et al. | ............... | 379/70 |
| 7,209,950 B2 * | 4/2007 | Bennett et al. | ............... | 709/206 |
| 2002/0162116 A1 * | 10/2002 | Read et al. | ............... | 725/106 |
| 2004/0072544 A1 * | 4/2004 | Alexis | ............... | 455/74.1 |

* cited by examiner

*Primary Examiner* — Simon Sing
(74) *Attorney, Agent, or Firm* — Toler Law Group (57) ABSTRACT

A system and method are disclosed for providing simple unified messaging. A method incorporating teachings of the present disclosure may include receiving an indication of a call from a calling party to a called party and answering the call at a premises of the called party. The calling party may be prompted to leave a message, and at least a portion of the message may be saved as an audio file. In response to recognizing that the calling party left the message, an outgoing message may be prepared. The audio file may be attached to the outgoing message, which may be addressed to a network node associated with a unified messaging mailbox of the called party. The message may then be sent from the premises to the network node. By employing teachings disclosed herein, a user may be able to make use of existing premises components and equipment to implement a network-based unified messaging system.

28 Claims, 5 Drawing Sheets

SYSTEM AND METHOD FOR SIMPLE UNIFIED MESSAGING

FIELD OF THE INVENTION

The present disclosure relates generally to messaging services, and more specifically to a system and method for simple unified messaging.

BACKGROUND

Depending on implementation details, a unified messaging service may effectively provide a subscriber with a single network-based repository for voice mail, electronic mail (email) and facsimile communications (fax). Most unified messaging services are designed to allow the subscriber to retrieve saved messages with one phone call or one visit to a website. While unified messaging services may provide some attractive features to subscribers, the services may be costly and complicated to implement.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Embodiments, including systems and techniques, are disclosed below for providing simple unified messaging. As an example, a technique incorporating teachings of the present disclosure may include receiving an indication of a call from a calling party and answering the call at a premises of a called party. The calling party may be prompted to leave a message, and at least a portion of the message may be saved as an audio file. In response to recognizing that the calling party left the message, an outgoing message may be prepared. The audio file may be attached to the outgoing message, which may be addressed to a network node associated with a unified messaging mailbox of the called party. The message may then be sent from the premises to the network node.

By employing teachings disclosed herein, a user may be able to make use of existing premises components and equipment to implement a network-based unified messaging system. As mentioned above, FIG. 1 presents a flow diagram 10 for a message collecting process incorporating teachings of the present disclosure. At operation 12, a calling party may initiate an incoming call for a called party. The incoming call may include a Plain Old Telephony Service (POTS) call placed at least partially over a Public Switched Telephone Network (PSTN). The call may also include a Voice over Internet Protocol (VoIP) call or some other packetized telephony or data call.

Figure 1:
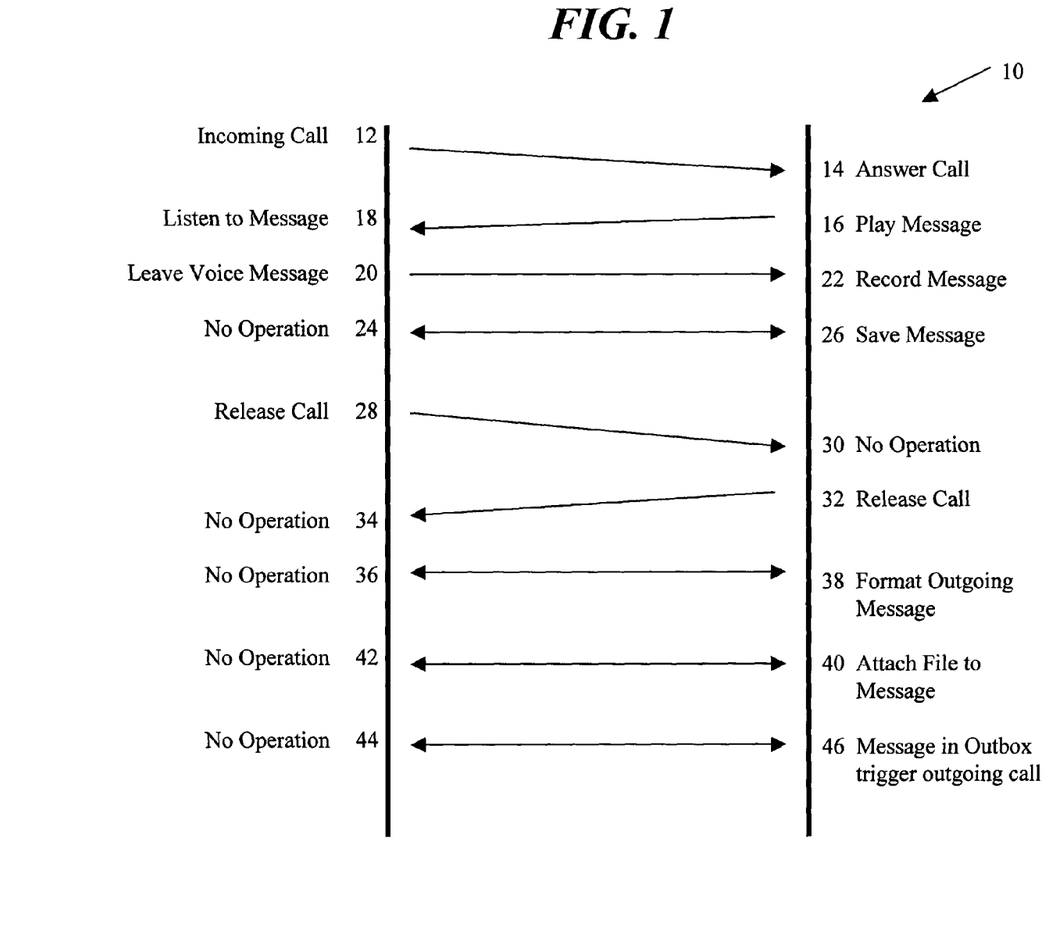
FIG. 1 presents a flow diagram for a message collecting process incorporating teachings of the present disclosure.

In some implementations, a packetized call may be routed to the called party across a communication path that includes a cable network, a direct broadcast satellite (DBS) system, a telecommunication network, a PSTN, and/or some other network capable of communicating information. To facilitate this communication, the called party may be employing a modem, which may be a cable modem supporting a Data Over Cable Service Interface Specification (DOCSIS) standard, a dial-up modem such as a v.90 or v.92 modem, a wireless modem such as one supporting 802.11(x) or some Time or Code Division Multiplexing technology, a satellite modem, and/or an xDSL modem.

At operation 14, the incoming call may be answered by an answering machine or service, and at operation 16 a pre-recorded message may be played for the calling party. The calling party may listen to the recording at operation 18 and begin leaving a message for the called party at operation 20. The message may be recorded at operation 22 and saved to memory in an appropriate form at operation 24. The format may include, for example, a .WAV file format, an MP3 file format, a .MIDI file format, a .AU file format, and/or some other sound format.

During saving operation 24, operation 26 may include a no operation (No Op). At operation 28, the calling party may have finished leaving the message and may release the call. Operation 30 may include a No Op, and operation 32 may involve a releasing of the call by the called party answering service or device. As the calling party may have already disengaged from the call, operations 34 and 36 may include No Ops.

At operation 38, a new outgoing message may be prepared. The message may be an email message, an Instant Messaging (IM) message, a Short Messaging Service (SMS) message, an Enhanced Messaging Service (EMS) message, a Multi-media Messaging Service (MMS) message, and/or a message prepared using some other messaging format. At operation 40, the recorded message saved at operation 24 may be attached to the message prepared at operation 38. The prepared message with the attached file may be moved into an "Outbox" in order to facilitate sending the message.

Operations 42 and 44 may include No Ops, and operation 46 may include an outbound call trigger. The outbound call trigger may signal that a prepared message with an attached file is ready for delivery. The eventual delivery may involve use of the Simple Mail Transfer Protocol (SMTP). SMTP may be used to send messages from a mail client to a mail server. Example delivery techniques may be better understood with reference to FIGS. 2 and 3.

As mentioned above, FIG. 2 presents a flow diagram for an analog message forwarding process 48 incorporating teachings of the present disclosure. At operation 50, a call may be placed to an Internet Service Provider (ISP). The call may be a first step in establishing a data connection through the ISP to a broader network like the Public Internet. The connection may include, for example, a dial-up connection.

Figure 2:
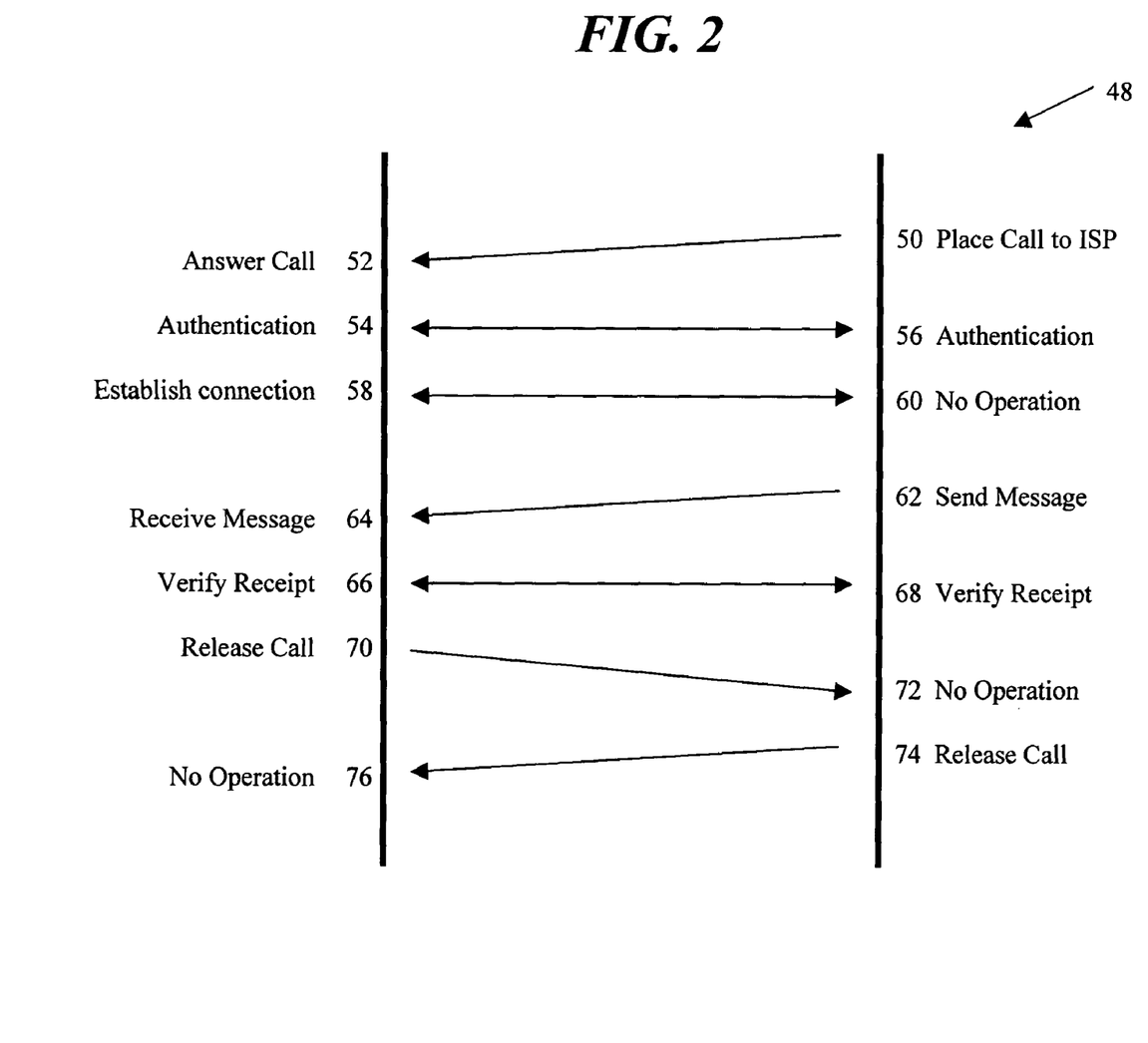
FIG. 2 presents a flow diagram for an analog message forwarding process incorporating teachings of the present disclosure.

At operation 52, a device associated with the ISP may answer the call and launch an authentication process at operation 54. The authentication process may include a relatively simple technique such as comparing a received username/password combination to a maintained list of acceptable username/password combinations. The process could also include additional and/or more complex authentication routines. In the depicted process 48, operation 56 may include inputting and/or delivering the requisite authentication information.

At operation 58, the ISP connection may be established without additional activity at operation 60. At operation 62, a message like the message prepared at operation 38 of FIG. 1 may be sent. The message may be received at operation 64, and verification of the successful send and receive may occur at operations 66 and 68.

At operation 70, the call to the ISP may be released by the ISP with a No Op at operation 72. Similarly, the call may be released by the caller at operation 74 with a No Op at operation 76. In practice, a voice message left for a called party at operation 20 of FIG. 1 and recorded and saved for the called party at operations 22 and 26 of FIG. 1 may be forwarded to a network-based mailbox of the called party through the execution of process 48.

The combination of processes 10 and 48 may effectively provide a dial-up user with a simple unified messaging service. Though a voice mail for a called party user may have been left on an answering machine located at the user's premises, execution of processes 10 and 48 may allow the user to retrieve the message by accessing a network-based repository. As such, a user may be able to log-on to a network like the Public Internet from a remote location and effectively check voice mail messages recorded at the user's home. The user may simply need, for example, to identify new messages in an email Inbox and launch an attached .WAV file to hear the message.

The technique employed to forward a recorded message to a network-based repository may depend in part on the type and the availability of a connection linking a user's premises connected electronic devices to a broader communication network. It should be understood that a user's premises could be a home, an office, a hotel room, and/or some other location associated with a given user.

Figure 3:
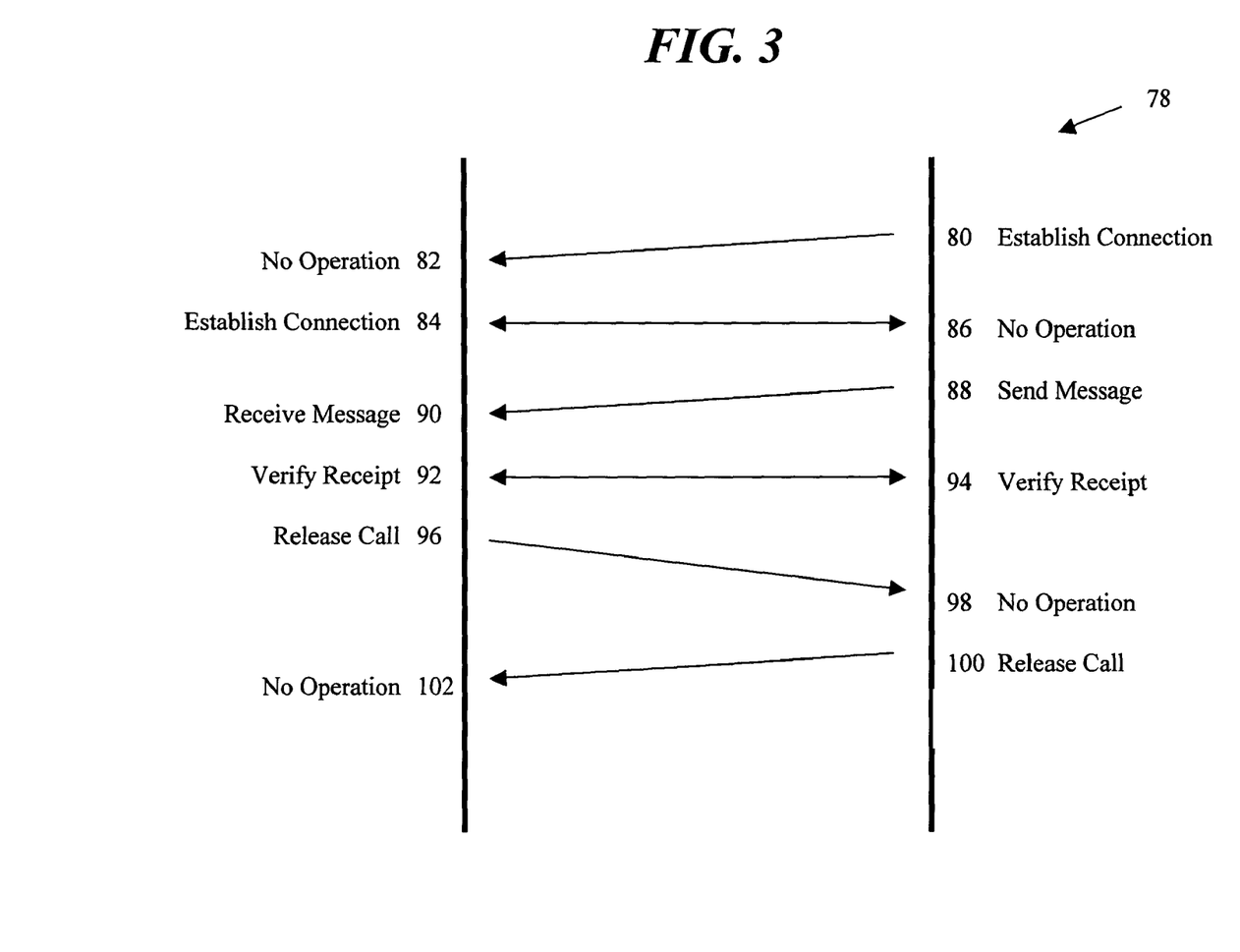
FIG. 3 presents a flow diagram for a digital message forwarding process incorporating teachings of the present disclosure.

If the user enjoys a broadband service, the user may choose to employ a technique like the one depicted in FIG. 3. As mentioned above, FIG. 3 presents a flow diagram for a digital message forwarding process 78 incorporating teachings of the present disclosure. At operation 80, a connected electronic device associated with the user may seek to establish a data connection to a network utility across a broader network like the Public Internet. The network utility may be, for example, an appropriate email server. In some embodiments, the network utility may be an email server associated with a network-based unified messaging service.

Operation 82 may involve a No Op on the part of the network utility. Operation 84 may involve activity by the remote network utility intended to establish a connection with the user device. The user device may perform a No Op at operation 86 in response. At operation 88, a message like the message prepared at operation 38 of FIG. 1 may be sent. The message may be received at operation 90, and verification of the successful send and receive may occur at operations 92 and 94.

At operation 96, the call and/or connection may be released by the network utility with a No Op at operation 98. Similarly, the connection may be released by the user electronic device at operation 100 with a No Op at operation 102. In practice, a voice message left for a called party at operation 20 of FIG. 1 and recorded and saved for the called party at operations 22 and 26 of FIG. 1 may be forwarded to a network-based unified mailbox of the called party through the execution of process 78. The combination of processes 10 and 78 may effectively provide a broadband or "always-on" connected user with a simple unified messaging service. In some cases, this simple service may have retrofit characteristics—allowing a user to make use of existing components and equipment to implement a unified messaging system.

As mentioned above in connection with processes 10, 48, and 78, an electronic mail message (or some other messaging format message) may be generated and sent to an intended recipient. In the above-described processes, the intended recipient may be a network-connected utility supporting a unified messaging service for a given user. The intended recipient may also be a user's wireless device, a utility supporting a service for a different user, and/or any other electronic device capable of receiving an electronic message.

In an implementation relying on electronic mail as a vehicle for communicating messages, a system component may compose a message and indicate the destination of the message using an e-mail client. When sending the message, the e-mail client may eventually connect to an e-mail server and pass to the server the "name" or address of the intended recipient, the "name" of the sender, the body of the message, and/or an attached file. For example, a service provider may offer a Simple Unified Messaging Service (SUMS), and the address of the intended recipient may be "User@SUMS.com". The address could also be associated with some other email account of the user. In some embodiments, the name of the sender may be chosen to allow a user checking his or her Inbox to quickly determine the nature of the message. For example, the sender name may be "SUMS-voicemail".

When receiving new messages, the email server may append new messages to the bottom of a file in the order that they arrive. When a user wants to look at received e-mails, an e-mail client running, for example, on a remote computing device like an office computer or wireless telephone, may connect to the server machine. This email client may: (1) ask the server to send a copy of the SUMS.TXT file, which may indicate newly received messages; (2) ask the server to erase and reset the SUMS.TXT file; (3) save the SUMS.TXT file on the local machine being used to access the server; and (4) parse the file into separate messages, which may be accomplished using the word "From:" as a separator. The email client may also allow the user to view and/or access the messages and their respective attachments in response to a double-click on a given message indicator. To effectuate the above, the email client may work with a Post Office Protocol (POP3) server or an Internet Mail Access Protocol (IMAP) server, both of which handle incoming mail.

As mentioned above, FIG. 4 shows one embodiment of a simple messaging system 104 incorporating teachings of the present disclosure. As depicted, system 104 may be geographically dispersed. Included in system 104 may be a customer premises 106. Premises 106 may be any of several different locations associated with a given user. For example, premises 106 may be a home, an office, an apartment, a hotel room, an automobile, or some other place. Within premises 106, a user may have a computer 108, a telephone 110, and an electronic device 112 that facilitates the communication of data with a broader network. In some embodiments, device 112 may be a modem.

Figure 4:
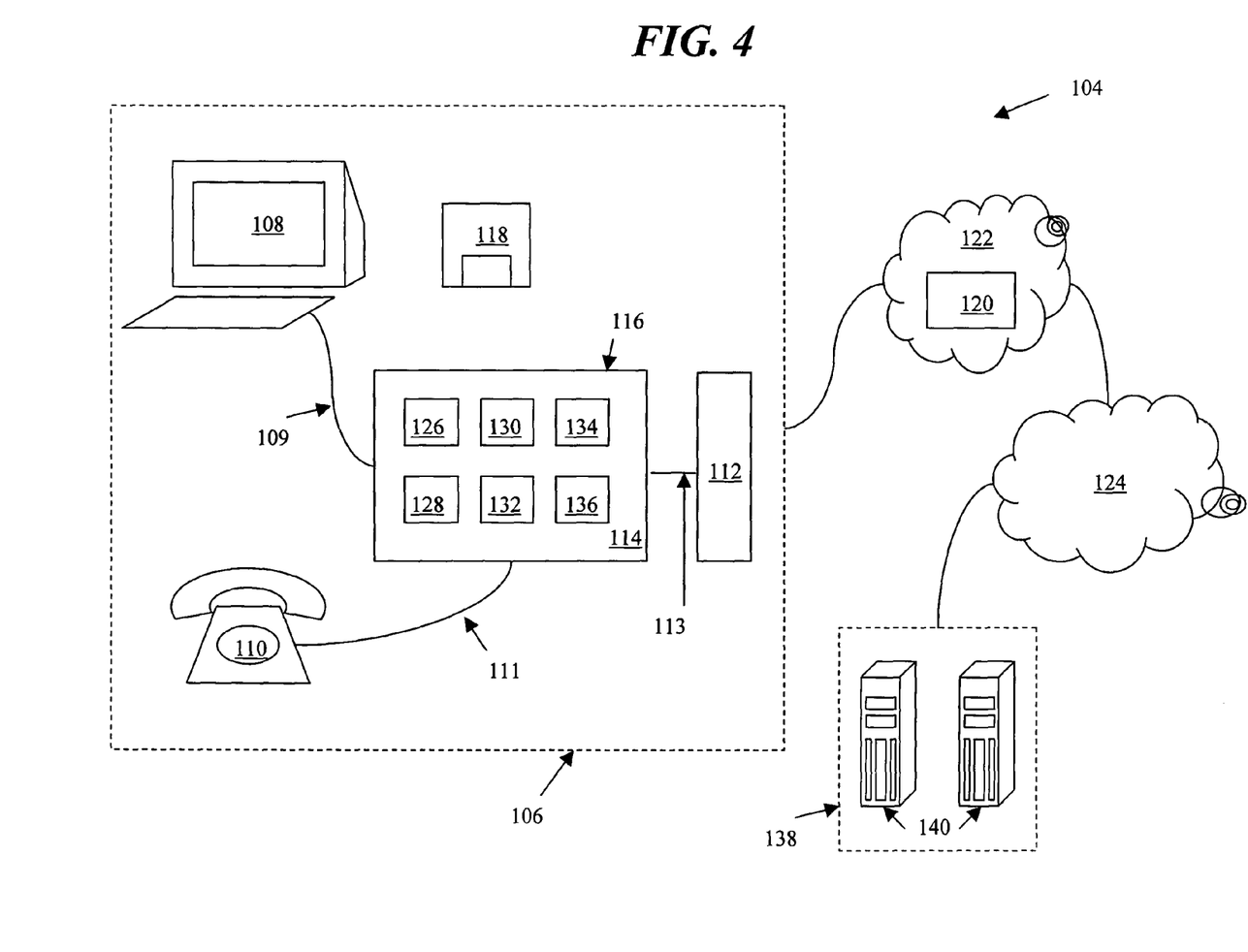
FIG. 4 shows one embodiment of a simple messaging system incorporating teachings of the present disclosure.

Interconnected with device 112, computer 108, and telephone 110, may be messaging device 114. Messaging device 114 may communicate with computer 108 across link 109 and communicate with telephone 110 across link 111. Additionally, messaging device 114 may communicate with device 112 across link 113. Links 109, 111, and 113, may be the same or different. They may include wireless RF connections like 802.11(x) or Bluetooth. The may also include twisted pair connections, coaxial cable connections, category 5 cabling connections, fiber connections, or some other connection type. In addition, communications across links 109, 111, and 113 may comply with the same or different protocols and standards. For example, available communication types may include wireless Ethernet, Ethernet, Voice over Internet Protocol (VoIP), POTS communication, and/or some other communication type.

In some embodiments, the interconnection points of links 109, 111, and 113 may include different types of jacks or connections. These connections may include, for example, an RJ-11 jack, a Universal Serial Bus (USB) connection, a coaxial cable interconnect, and/or some other effective connector. As shown in FIG. 4, messaging device 114 may include a housing component 116 the defines an enclosure within which several devices and/or components may be located. The following discussion relates to a system in which the messaging device operations are performed by a dedicated electronic device. Those skilled in the art will recognize that other implementations and embodiments are possible. For example, many of the operations described herein may be implemented by a computer like computer 108.

For example, computer 108 may have access to a computer readable medium 118. Computer readable medium 118 may have computer-readable data capable of directing computer 108 to answer an incoming telephone call from a calling party, to play a pre-recorded message that prompts the calling party to leave a message, to record a voice message from the calling party, to compose an electronic mail message in response to the voice message, to attach an audio file representing the voice message to the electronic mail message, and to initiate sending of the electronic mail message. Computer readable medium 118 may also include instructions to facilitate the configuring of a dedicated device like messaging device 114.

In operation, messaging device 114 may connect to a network node 120 via device 112. Node 120 may take several forms. It may be associated with an Internet Service Provider (ISP). It may be a Digital Subscriber Line Access Multiplexer (DSLAM) associated with a PSTN. It may be a piece of equipment at a cable head end. As depicted, node 120 is associated with a service provider network 122 and facilitates access to Public Internet 124.

However messaging device 114 interconnects with a broader network, a call awareness trigger 126 may recognize when an incoming call is directed to premises 106. If the call goes unanswered for some predefined period, call answering mechanism 128 may answer the call and cause the presentation of a message prompting the calling party to leave a message. The call may be a voice call, a data call, a multimodal call, and/or some combination thereof. Similarly, the left message may include both an audio portion and a non-audio portion. For example, the calling party may leave a voice message and a textual or visual message. The left message may be stored on memory 130, which may be flash or some other appropriate memory type.

In response to the left message, messaging engine 132 may generate an outgoing message. The outgoing message may be an electronic mail message and/or some other messaging type. It may be addressed to one or more intended recipients and may include an attachment representing the message stored in memory 130. The outgoing message with attachment may then be placed in an outbox for delivery via interface 134 and device 112. The various operations of messaging device 114 may be coordinated by processor 136 and configured by computer 108 executing instructions stored on medium 118. A message output by messaging device 114 may travel through service provider network 122 and Public Internet 124 to a unified messaging center 138. Messaging center 138 may include several computing platforms and storage facilities. As depicted, messaging center 138 includes at least message servers 140.

In a system using email as the messaging platform, messaging engine 132 may communicate with one of servers 140, which may be a Simple Mail Transfer Protocol (SMTP) server. In practice, an SMTP server may listen on well-known port number 25. When messaging device 114 composes a message and initiates a send, a thin email client, which may be included in messaging engine 132, may connect to an SMTP server using port 25. The client may have a conversation with the SMTP server, telling the SMTP server the address of the sender and the address of the recipient, as well as providing the body of the message and any attachments. The SMTP server may take the "to" address and break it into two parts including the recipient name and the domain name.

If the "to" address is attached to the same domain as the sender, the SMTP server may simply hand the message to the POP3 server for the identified domain using a delivery agent program. If the recipient is at another domain, the SMTP server may need to communicate with that domain. As such, the SMTP server may have a conversation with a Domain Name Server (DNS) to find an Internet Protocol (IP) address for an SMTP server on the different domain. The DNS may reply with the one or more IP addresses for the SMTP server(s) associated with the different domain. The SMTP server of the sender may connect with the SMTP server of the recipient using port 25. The two servers may have a conversation similar to the simple text conversation that the thin e-mail client had with the sender SMTP server. The recipient's SMTP server may now recognize that the domain name for the recipient is at its domain and it may hand the message to the recipient domain's POP3 server, which puts the message in the recipient's mailbox.

As described above, an e-mail client of messaging engine 132 may facilitate the addition of attachments to outgoing e-mail messages. In addition to saved audio message files, attachments may include word processing documents, spreadsheets, snapshots and pieces of software. As such, some attachments may not be text. However, some e-mail messages may be designed for text information only. Because an attachment may not be text, the attachment may need to be converted into uuencoded text format. In operation, the attachment may be communicated through the email system in a uuencoded format and reformatted into a playable file at an email client executing on a platform used by the recipient to check his or her email.

Figure 5:
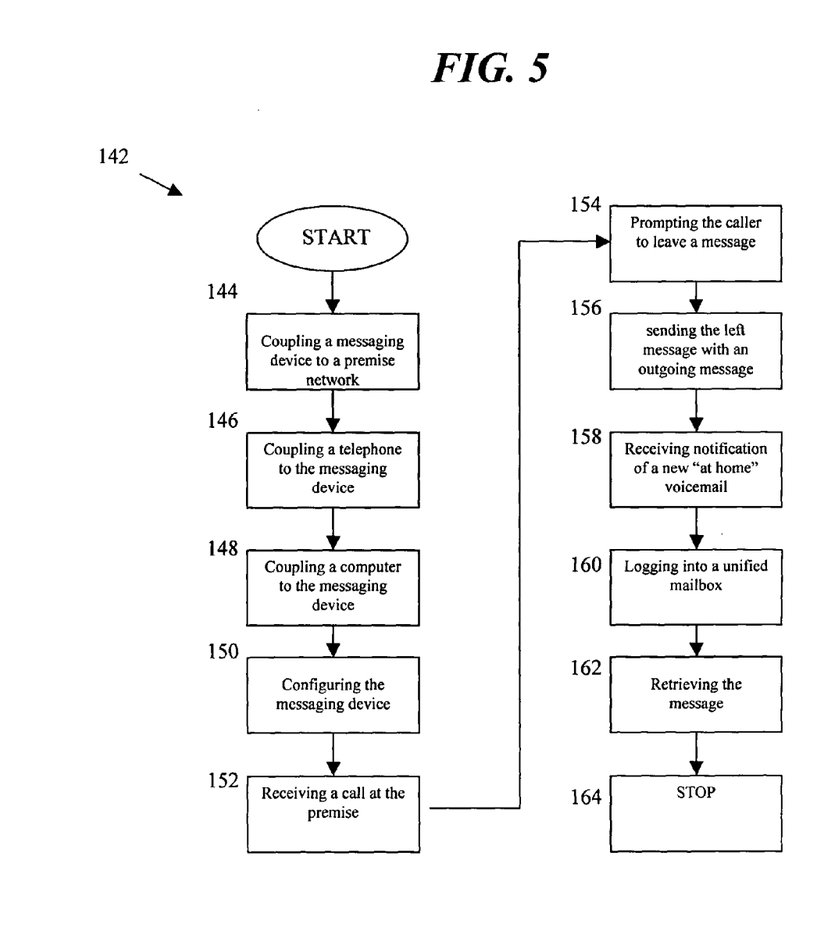
FIG. 5 presents a flow chart for a simple messaging technique incorporating teachings of the present disclosure.

Use of a system, like system 104, may be better understood by reference to FIG. 5. As mentioned above, FIG. 5 presents a flow chart for a simple messaging technique 142 incorporating teachings of the present disclosure. At step 144, a user may communicatively couple a messaging device to a premises network. The premises network may include "in-house" wiring and may be connected to a broader or wide-area network. At steps 146 and 148 respectively, the user may communicatively couple the messaging device to a telephone station and a computer. The user may use the computer at step 150 to configure the messaging device. This configuring may involve "telling" the device to answer incoming telephone calls after X number of rings. It may also involve saving messaging and connection parameters like the address or addresses of intended recipients, dialing instructions for connecting to a data network, username/password combinations, SMTP server identifiers, and/or other parameters.

At step 152, an incoming call may be received at the premises, and at step 154, the messaging device may answer the call and prompt the caller to leave a message. At step 156, the caller may have disengaged from the call and the messaging device may prepare an outgoing email message with an attachment including a file representing the caller's message. The outgoing message may then be communicated to a network-based unified messaging mailbox, and at step 158, the user may receive a notification. The notification may be sent to the user in several different ways and may indicate that a new voicemail message is available at the unified messaging mailbox. The notification may be sent, for example, as a mobile alert, an SMS, EMS, or MMS message, an IM message, and/or a separate email message.

At step 160, the user may log in to the mailbox and retrieve the message at step 162. Technique 142 may then progress to stop at step 164. In practice, the user may treat the retrieved message like other email messages. In preferred embodiments, the caller's call may have passed caller identification (Caller ID) information, and the messaging device may have compared the Caller ID information against a contact list to determine the caller's identity and personal email address. In such an embodiment, the messaging device may have included the caller's email address in the outgoing message to the unified messaging mailbox. In one embodiment of a system, like system 104, the user may be able to select "Reply" in their email client to compose a response to the caller's message. The "To:" portion of the reply template may be auto-populated with the caller's personal email address—allowing the user to reply to the caller's voicemail message with an email message.

In various embodiments, the telephones, computers, electronic devices, and/or platforms, described above, may take forms including wireless and cordless phones, personal digital assistants with built in communications circuitries, wireless telephones, cellular telephones, mobile telephones, laptop computers, desktop computers, and other electronic devices supporting the communication of information.

The methods and systems described herein provide for an adaptable implementation. Although certain embodiments have been described using specific examples, it will be apparent to those skilled in the art that the invention is not limited to these few examples. Additionally, various types of wireless transceivers, transmitters, receivers, devices, and protocols are currently available which could be suitable for use in employing the methods as taught herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A machine-implemented method comprising:

answering a call from a calling party in a Voice over Internet Protocol (VoIP) format at a premises of a called party;

saving at least a portion of a message as an electronic audio file, wherein the message is received from the calling party via the call;

preparing an electronic mail message in response to recognizing that the message has been received, wherein the electronic mail message includes an electronic mail address associated with the calling party;

attaching the electronic audio file to the electronic mail message;

addressing the electronic mail message to a plurality of recipients associated with a unified messaging mailbox of the called party; and initiating sending of the electronic mail message and the attached electronic audio file from the premises to an email server, wherein the email server appends the electronic mail message to a file in an order that the electronic mail message is received, the file including received electronic mail messages, and wherein the email server sends a copy of the file to an email client in response to the email server receiving a request from the email client to view the received electronic mail messages.

2. The method of claim 1, further comprising:

disconnecting from the call;

prompting a modem to dial a telephone number associated with an Internet Service Provider;

recognizing that a connection exists with the Internet Service Provider; and outputting information representing the electronic mail message for delivery via the connection.

3. The method of claim 1, further comprising:

determining that a data connection exists; and utilizing the data connection to send the electronic mail message.

4. The method of claim 1, wherein the electronic mail message comprises a multi-modal message having an audio component and a non-audio component.

5. The method of claim 4, wherein the non-audio component includes a visual message, wherein the visual message is not a textual message.

6. The method of claim 1, wherein a format of the electronic audio file is one of a Waveform (.WAV) format, a Moving Picture Experts Group (MPEG) Audio Layer 3 (MP3) format, a Musical Instrument Digital Interface (.MIDI) format, and an Audio Units (.AU) format.

7. The method of claim 1, further comprising preparing a reply electronic mail message, wherein an outgoing address line of the reply electronic mail message is automatically populated with the electronic mail address associated with the calling party.

8. The method of claim 7, wherein the reply electronic mail message is prepared in response to receipt of the electronic mail message by a user.

9. The method of claim 7, wherein the outgoing address line of the reply electronic mail message is automatically populated in response to a user-generated reply request.

10. The method of claim 1, wherein the email client saves the file at a local machine that is used to access the email server, and wherein the email server deletes the file after the file is sent to the email client.

11. The method of claim 1, wherein the email client parses the file into separate electronic mail messages in response to a user selection.

12. A method of facilitating unified messaging, the method comprising:

communicatively coupling a messaging device to a premises network that is communicatively coupled to a wide-area communication network, the wide-area communication network comprising an Internet Protocol network; and employing the messaging device to:
answer an incoming telephone call from a calling party;
play a pre-recorded message to the calling party;
record a message from the calling party;
compare caller identification (ID) information received with the incoming telephone call to a contact list to identify an email address associated with the calling party;
compose an electronic mail message in response to the message, wherein the electronic mail message includes the email address associated with the calling party, and wherein the electronic mail message is addressed to a plurality of recipients associated with a unified messaging mailbox of a called party of the incoming telephone call;
attach at least one file representing the message to the electronic mail message; and
initiate sending of the electronic mail message to an email server via the wide-area communication network,
wherein the email server appends the electronic mail message to a file in an order that the electronic mail message is received, the file including received electronic mail messages, and
wherein the email server sends a copy of the file to an email client in response to the email server receiving a request from the email client to view the received electronic mail messages.

13. The method of claim 12, further comprising executing code directing a computer to store a username and a password in a memory associated with the messaging device, to indicate a messaging address for an intended recipient of the electronic mail message, and to indicate an identifier of a remote messaging server communicatively coupled to the wide-area communication network.

14. The method of claim 12, further comprising:
determining that a data connection exists interconnecting the premises network and a node of the wide-area communication network; and
utilizing the data connection to send the electronic mail message.

15. The method of claim 12, further comprising:
disconnecting from the incoming telephone call;
prompting a modem to dial a telephone number associated with an Internet Service Provider;
recognizing that a connection exists with the Internet Service Provider; and
utilizing the connection to send the electronic mail message.

16. The method of claim 12, wherein a format of the at least one file is one of a Waveform (.WAV) format, a Moving Picture Experts Group (MPEG) Audio Layer 3 (MP3) format, a Musical Instrument Digital Interface (.MIDI) format, and an Audio Units (.AU) format.

17. The method of claim 12, further comprising preparing a reply electronic mail message, wherein an outgoing address line of the reply electronic mail message is automatically populated with the email address associated with the calling party.

18. The method of claim 12, wherein the email client saves the file at a local machine that is used to access the email server.

19. The method of claim 12, wherein the email client parses the file into separate electronic mail messages in response to a user selection.

20. A computer-readable medium storing computer-readable instructions that, when executed by a processor, cause the processor to:
answer an incoming telephone call from a calling party via an Internet Protocol network;
play a pre-recorded message that prompts the calling party to leave data;
record a message from the calling party, wherein the message has an audio portion and a visual portion;
obtain an email address associated with the calling party by comparing caller identification information to a contact list, wherein the caller identification information is received with the incoming telephone call;
compose an electronic mail message in response to the message, wherein the electronic mail message includes the email address associated with the calling party, and wherein the electronic mail message is addressed to a plurality of recipients associated with a unified messaging mailbox of a called party of the incoming telephone call;
attach at least one file representing the message to the electronic mail message; and
initiate sending of the electronic mail message to an email server,
wherein the email server appends the electronic mail message to a file in an order that the electronic mail message is received, the file including received electronic mail messages, and
wherein the email server sends a copy of the file to an email client in response to the email server receiving a request from the email client to view the received electronic mail messages.

21. The computer-readable medium of claim 20, wherein a format of the at least one file is one of a Waveform (.WAV) format, a Moving Picture Experts Group (MPEG) Audio Layer 3 (MP3) format, a Musical Instrument Digital Interface (.MIDI) format, and an Audio Units (.AU) format.

22. The computer-readable medium of claim 20, further storing computer-readable instructions that, when executed by the processor, cause the processor to prepare a reply electronic mail message, wherein an outgoing address line of the reply electronic mail message is automatically populated with the email address associated with the calling party.

23. The computer-readable medium of claim 20, wherein the email client saves the file at a local machine that is used to access the email server.

24. The computer-readable medium of claim 20, wherein the email client parses the file into separate electronic mail messages in response to a user selection.

25. A messaging system, comprising:
a network interface responsive to an Internet Protocol network to receive a call;
a call answering mechanism to:
answer the call;
prompt a calling party to leave an audio portion of a message; and
prompt the calling party to leave a visual portion of the message; and
a messaging engine to:
obtain an email address associated with the calling party by comparing caller identification information to a contact list, wherein the caller identification information is received with the call;

compose an electronic mail message that includes the audio portion of the message, the visual portion of the message, and the email address associated with the calling party, wherein the electronic mail message is addressed to a plurality of recipients associated with a unified messaging mailbox of a called party to the call; and transmit the electronic mail message to an email server, wherein the email server appends the electronic mail message to a file in an order that the electronic mail message is received, the file including received electronic mail messages, and wherein the email server sends a copy of the file to an email client in response to the email server receiving a request from the email client to view the received electronic mail messages.

26. The messaging system of claim 25, wherein the visual portion comprises a text message.

27. The messaging system of claim 25, wherein the visual portion comprises a visual message, wherein the visual message is not a textual message.

28. The messaging system of claim 25, wherein the messaging engine is further to prepare a reply electronic mail message, wherein an outgoing address line of the reply electronic mail message is automatically populated with the email address associated with the calling party.

* * * * *